(12) United States Patent
Kakani

(10) Patent No.: US 8,706,124 B2
(45) Date of Patent: Apr. 22, 2014

(54) DATA PATH TRANSFER FOR MULTIBAND COMMUNICATION

(75) Inventor: Naveen Kumar Kakani, Irving, TX (US)

(73) Assignee: Nokia Corporation, Espoo (FI)

( * ) Notice: Subject to any disclaimer, the term of this patent is extended or adjusted under 35 U.S.C. 154(b) by 1110 days.

(21) Appl. No.: 12/561,452

(22) Filed: Sep. 17, 2009

(65) Prior Publication Data
US 2011/0065440 A1    Mar. 17, 2011

(51) Int. Cl.
H04W 72/00    (2009.01)

(52) U.S. Cl.
USPC ............ 455/450; 455/63.3; 455/68; 455/434; 455/179.1; 455/260.3; 455/436; 455/45; 455/439; 455/509; 455/73

(58) Field of Classification Search
USPC ........ 455/73, 41.2, 179.1, 260, 3.01, 436, 45, 455/439, 509, 450, 63.3, 68, 434; 370/338, 370/310, 465, 392, 208, 281, 329, 428, 260, 370/252, 330, 344, 225, 222; 709/230; 340/539.1
See application file for complete search history.

(56) References Cited

U.S. PATENT DOCUMENTS

| | | | |
|---|---|---|---|
| 6,760,772 B2 * | 7/2004 | Zou et al. | 709/230 |
| 7,590,426 B2 * | 9/2009 | Cho | 455/456.1 |
| 7,639,706 B2 * | 12/2009 | Hamada et al. | 370/428 |
| 8,045,922 B2 * | 10/2011 | Sherman et al. | 455/41.2 |
| 8,102,853 B2 * | 1/2012 | Ngo et al. | 370/392 |
| 8,218,654 B2 * | 7/2012 | Cheng et al. | 375/240.28 |
| 2002/0055343 A1 * | 5/2002 | Stetzler et al. | 455/260 |
| 2004/0171384 A1 * | 9/2004 | Holma et al. | 455/436 |
| 2005/0021885 A1 * | 1/2005 | Anderson et al. | 710/29 |
| 2005/0117601 A1 * | 6/2005 | Anderson et al. | 370/465 |
| 2005/0163093 A1 | 7/2005 | Garg et al. | |
| 2005/0243849 A1 | 11/2005 | Wentink | |
| 2006/0114813 A1 * | 6/2006 | Seki et al. | 370/208 |
| 2007/0060082 A1 * | 3/2007 | Okumura et al. | 455/179.1 |
| 2007/0153729 A1 * | 7/2007 | Alapuranen | 370/329 |
| 2007/0214490 A1 * | 9/2007 | Cheng et al. | 725/135 |
| 2007/0262913 A1 * | 11/2007 | Onomatsu et al. | 343/876 |

(Continued)

FOREIGN PATENT DOCUMENTS

| | | | |
|---|---|---|---|
| WO | 2007095077 A2 | 8/2007 | |
| WO | 2008014100 A2 | 1/2008 | |

OTHER PUBLICATIONS

International Search Report issued in international application No. PCT/FI2010/050622 on Dec. 1, 2010.

(Continued)

Primary Examiner — Joseph Arevalo
(74) Attorney, Agent, or Firm — Locke Lord LLP

(57) ABSTRACT

Method, apparatus, and computer program product embodiments are disclosed to setup data path transfer between concurrently operating frequency bands of multiband wireless LAN (WLAN) devices. The embodiments provide an enhancement to the Fast Session Transfer (FST) by introducing a new Information Element (IE) in the Fast Session Transfer (FST) frames to enable negotiating the parameters to be established as a result of switching of at least a portion of the existing data/traffic streams to another frequency band. The new Information Element (IE) includes at least the number of streams being switched and for each stream being switched the stream ID. The new Information Element enables the transmitting and receiving devices to negotiate the connection setup parameters associated with a requested transfer of the operating frequency band.

14 Claims, 7 Drawing Sheets

(56) References Cited

U.S. PATENT DOCUMENTS

| | | | |
|---|---|---|---|
| 2008/0076353 A1* | 3/2008 | Rofougaran | 455/41.2 |
| 2009/0137206 A1* | 5/2009 | Sherman et al. | 455/41.2 |
| 2009/0175374 A1* | 7/2009 | Seki et al. | 375/260 |
| 2009/0318075 A1* | 12/2009 | Kwon et al. | 455/3.01 |
| 2010/0122284 A1* | 5/2010 | Yoon et al. | 725/33 |
| 2010/0142416 A1* | 6/2010 | Kim | 370/281 |
| 2010/0208633 A1* | 8/2010 | Takano | 370/310 |
| 2010/0259682 A1* | 10/2010 | Unger | 348/569 |
| 2010/0332822 A1* | 12/2010 | Liu et al. | 713/151 |
| 2011/0053521 A1* | 3/2011 | Cordeiro | 455/73 |

OTHER PUBLICATIONS

"Multi-Gigabit Wireless Specification", WGA Draft Candidate D0.5r0, Jul. 30, 2009, Wireless Gigabit Alliance (WGA).

"WiGig Alliance Announces Completion of its Multi-Gigabit Wireless Specification", (Press Release), Wireless Gigabit Alliance (WGA), Dec. 10, 2009.

Eldad Perahia, "VHT60 Tutorial, IEEE 802.11-08/0814r1", Jul. 14, 2008.

Jean-Pierre Ebert; "Paving the Way for Gigabit Networking", Global Communications Newsletter, Apr. 2005.

* cited by examiner

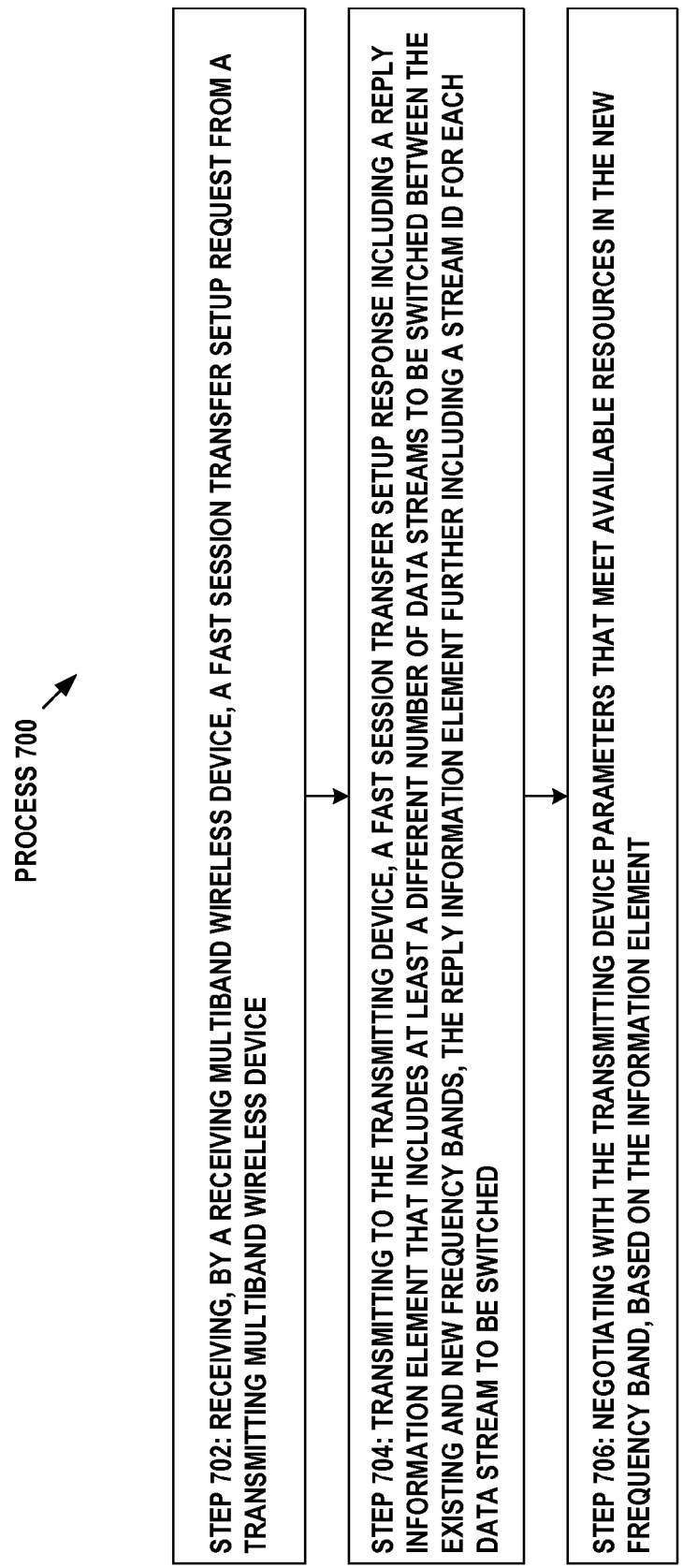

DATA PATH TRANSFER FOR MULTIBAND COMMUNICATION

FIELD

The field of the invention relates to wireless communication and more particularly to multiband operation in wireless communication devices.

BACKGROUND

Wireless communication over large geographic areas is provided by cellular telephone networks. These network technologies have commonly been divided by generations, starting in the late 1970s to early 1980s with first generation (1G) analog cellular telephones that provided baseline voice communication, to modern digital cellular telephones. Global System for Mobile Communications (GSM) is an example of a widely employed 2G digital cellular network communicating in the 900 MHz/1.8 GHz bands in Europe and at 850 MHz and 1.9 GHz in the United States. This network provides voice communication and also supports the transmission of textual data via the Short Messaging Service (SMS). SMS allows a wireless communications device (WCD) to transmit and receive text messages of up to 160 characters, while providing data transfer to packet networks, Integrated Services Digital Network (ISDN) and Plain Old Telephone Service (POTS) users at 9.6 Kbps. The Multimedia Messaging Service (MMS), an enhanced messaging system allowing for the transmission of sound, graphics and video files in addition to simple text, has also become available in certain devices. Soon, emerging technologies such as Digital Video Broadcasting for Handheld Devices (DVB-H) will make streaming digital video, and other similar content, available via direct transmission to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. A 1 Mbps Bluetooth™ radio may transmit and receive data at a rate of 720 Kbps within a range of 10 meters, and may transmit up to 100 meters with additional power boosting. Enhanced Data Rate (EDR) technology, which is also available, may enable maximum asymmetric data rates of 1448 Kbps for a 2 Mbps connection and 2178 Kbps for a 3 Mbps connection. In addition to Bluetooth™, other popular short-range wireless networks include for example IEEE 802.11 Wireless LAN (WLAN) operating in the Industrial Scientific Medical frequency band at 2.4 GHz. and in the 5 GHz frequency band. Other popular short-range wireless networks include for example Wireless Universal Serial Bus (WUSB), Ultra Wideband (UWB), ZigBee (IEEE 802.15.4 and IEEE 802.15.4a). Each of these exemplary wireless mediums has features and advantages that make them appropriate for various applications. The IEEE 802.11 Standard-2007 entitled "Part 11: Wireless LAN Medium Access Control (MAC) and Physical Layer (PHY) Specifications", published by the IEEE Computer Society, 12 Jun. 2007, is incorporated herein by reference.

The Wireless Gigabit Alliance (WGA) is developing a new, standardized short-range, wideband wireless technology within the IEEE 802.11 Wireless LAN Standard, to transmit data, video, and other content using the unlicensed 60 GHz frequency band, to personal computers, high definition televisions, mobile media players, and the like. The WGA Draft Specification entitled "WGA-redline-D05r0", prepared by the WGA Technical Working Group, dated Jul. 30, 2009, and publicly available thru the WGA, is incorporated herein by reference. The 60 GHz frequency band enables the transmission of large bandwidth data streams with a high quality of service (QoS). However, transmissions in the 60 GHz band tend to be directional and may be limited to line-of-sight. Thus, the Wireless Gigabit Alliance (WGA) incorporates into its new standard, a multi-band radio capability to enable a pair of wireless devices (STAs) to simultaneously operate in more than one band. A pair of wireless devices may transfer their communications session when conditions cause error rates to increase. A communications session may be transferred from using the 60 GHz frequency band to using a lower frequency band, such as the 5 GHz frequency band or the 2.4 GHz frequency band that are omnidirectional and not limited to line-of-sight, but at a sacrifice of available bandwidth. The transmitting wireless device (STA) sends a Fast Session Transfer (FST) Setup Request frame to the other multi-band capable STA, on the current operating channel, which remains pending until an FST Setup Response has been received from that STA. It is likely the QoS and the size of data packets that can be provided is not adequate at the requested frequency band and the transfer cannot be made. Transferring from one band to another during a communications session needs to be as seamless as possible to avoid perceptible interruptions in the delivery of content to the receiving device.

SUMMARY

Method, apparatus, and computer program product embodiments are disclosed to setup data path transfer between concurrently operating frequency bands of multi-band wireless LAN (WLAN) devices. The embodiments provide an information element to enable negotiating the parameters to be established as a result of switching of at least a portion of the existing data/traffic streams to a new frequency band. The information element includes at least the number of streams being switched and the stream ID for each stream being switched. The information element enables the transmitting and receiving devices to negotiate the connection setup parameters associated with a requested transfer of the operating frequency band. The transmitting wireless device sends a session transfer request. The receiving wireless device replies with a session transfer response with the information element that either accepts the requested parameters or replies with an alternate number of streams being switched and the stream ID for each alternate stream being switched. In this manner, there is no need to re-establish the traffic streams, but instead the existing parameters may be modified or scaled to meet the available resources in the new band, for example the quality of service and the size of data packets that can be provided. This allows the state of the data exchanges, for example the Acknowledgement bitmap, to be carried forward from one band to another.

The session transfer request may include an information element that includes at least a number of data streams to be switched between an existing operating frequency band and a concurrently operating new frequency band, the information element further including a stream ID for each data stream to be switched.

The information element may be included in the fast session transfer setup request frame and in the fast session transfer setup response frame. Alternately, the information element may be included in a separate action frame.

In example embodiments the information element may include the following example information:

1) For example, the information element may include the identity of the streams being switched from one band to another, for example the traffic ID or traffic stream identifier may be used to identify and distinguish the streams.

2) For example, the information element may include the sequence number of the streams. For example, the information element may use the last sequence number of a traffic stream that would be sent in the current band or the starting sequence number of the first data frame that would be transmitted in the new band. This is an estimate because there is a delay between the initiation of fast session transfer and the actual completion of fast session transfer.

In one example embodiment, each of the setup parameters may be negotiated if they need to be updated before the fast session transfer or after fast session transfer. In another example embodiment the parameters may be updated after fast session transfer and before any data transfer begins.

In one example embodiment of the invention, the information element may include the following fields.

Length of information element (one byte field)
Number of streams being switched (one byte field)
For each stream being switched, carry the following information (3 bytes each):
Stream ID (4 bits)
In one example embodiment, following fields may optionally be included:
Sequence Number (12 bits)
Need for change in setup parameters flag (1 bit)
Block ACK parameters update flag (1 bit)
Optionally have another bit to signal whether to Change the setup before fast session transfer or after fast session transfer (1 bit)
Traffic specification Update flag (1 bit)
Optionally have another bit to signal whether to change the setup before fast session transfer or after fast session transfer (1 bit)
Reserved (3 bits)

Example method, apparatus, and computer program product embodiments are disclosed for:

transmitting, by a transmitting multiband wireless device, a session transfer request to a receiving multiband wireless device;

receiving from the receiving device, a session transfer response including a reply Information Element that includes at least a different number of data streams to be switched between the existing and new frequency bands, the reply information element further including a stream ID for each data stream to be switched; and negotiating with the receiving device parameters that meet available resources in the new frequency band, based on said information element.

The session transfer request may include an information element that includes at least a number of data streams to be switched between an existing operating frequency band and a concurrently operating new frequency band, the information element further including a stream ID for each data stream to be switched.

Example method, apparatus, and computer program product embodiments are disclosed for:

receiving, by a receiving multiband wireless device, a session transfer request from a transmitting multiband wireless device;

transmitting to the transmitting device, a session transfer response including a reply information element that includes at least a different number of data streams to be switched between the existing and new frequency bands, the reply information element further including a stream ID for each data stream to be switched; and negotiating with the transmitting device parameters that meet available resources in the new frequency band, based on said information element.

The session transfer request may include an information element that includes at least a number of data streams to be switched between an existing operating frequency band and a concurrently operating new frequency band, the information element further including a stream ID for each data stream to be switched.

In this manner, there is no need to re-establish the traffic streams, but instead the existing parameters may be modified or scaled to meet the available resources in the new band, for example the quality of service and the size of data packets that can be provided. This allows the state of the data exchanges, for example the Acknowledgement bitmap, to be carried forward from one band to another. Also, if for any reason, for example quality of service, there is any problem in switching a stream to be in a new band, it is possible to switch only specific streams by including only the stream IDs in the Information Element for the specific streams that are to be switched. Alternately, it is possible to abort the switching of all the streams.

DESCRIPTION OF THE FIGURES

FIG. 7 is an example flow diagram of another process 700 for the operation of the receiving multiband wireless device 100B.

DISCUSSION OF EXAMPLE EMBODIMENTS OF THE INVENTION

Figure 1:
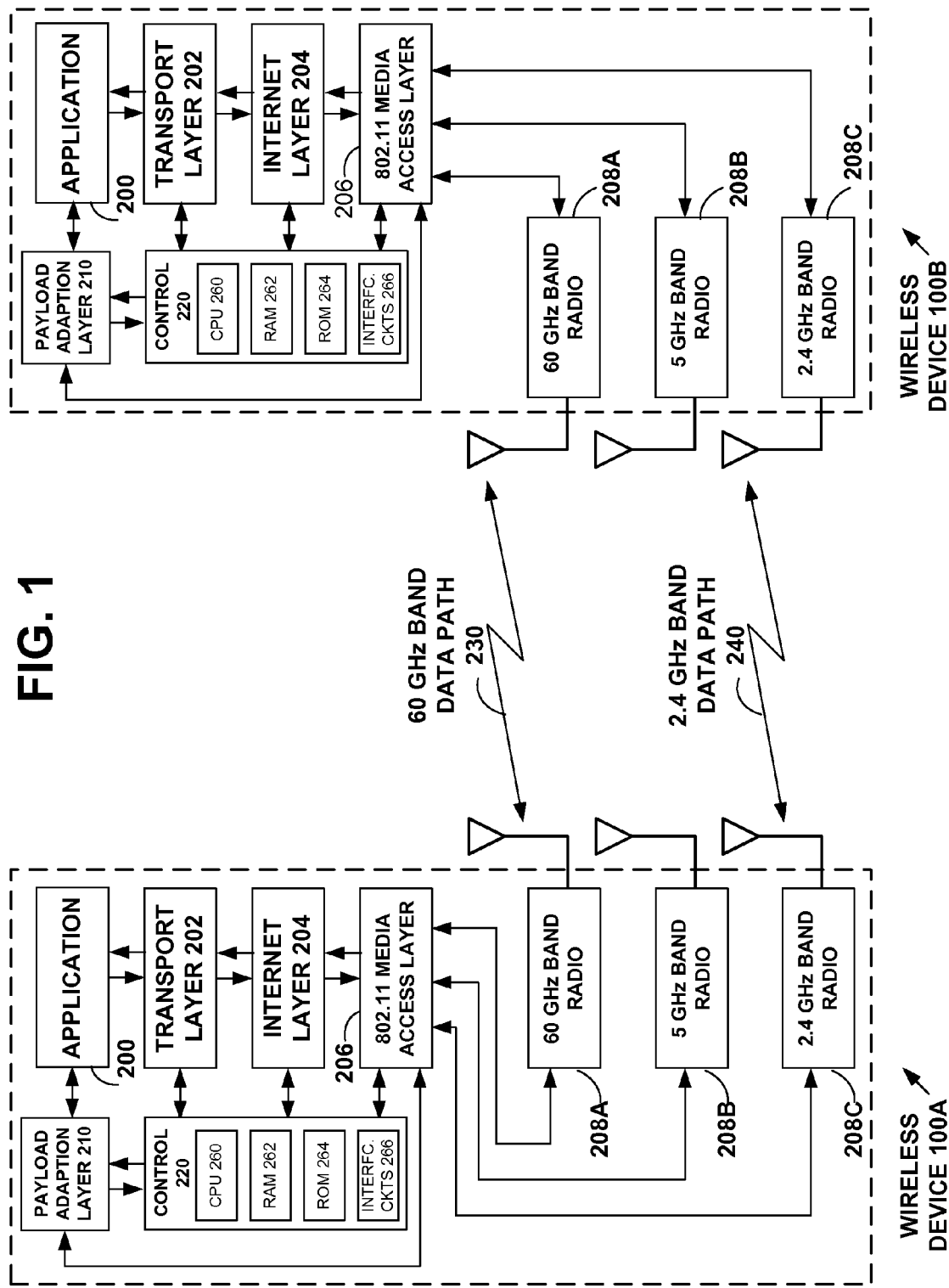
FIG. 1 illustrates an example functional block diagram of an example embodiment of the mobile wireless devices (STAs) 100A and 100B.

Embodiments of the invention setup data path transfer between concurrently operating frequency bands of multiband communication devices. FIG. 1 illustrates a functional block diagram of an example embodiment of the multiband wireless devices (STAs) 100A and 100B. The multiband wireless devices (STAs) 100A and 100B may each be a stationary (i.e. fixed location) device or a mobile communications device, PDA, cell phone, laptop or palmtop computer, or the like. The multiband wireless devices (STAs) 100A and 100B include a control module 220, which includes a central processing unit (CPU) 260, a random access memory (RAM)

262, a read only memory (ROM) 264, and interface circuits 266 to interface with a battery and other power sources, key pad, touch screen, display, microphone, speakers, ear pieces, camera or other imaging devices, etc. in the devices 100A and 100B. The RAM 262 and ROM 264 can be removable memory devices such as smart cards, SIMs, WIMs, semiconductor memories such as RAM, ROM, PROMS, flash memory devices, etc.

The multiband wireless devices (STAs) 100A and 100B include an Internet protocol stack that includes the user's application program 200 at the top, the Transmission Control Protocol (TCP) transport layer 202, and the Internet Protocol (IP) layer 204, the 802.11 Media Access Control (MAC) layer 206, and the multiband PHY layer includes three radio transceivers 208A, 208B, and 208C at the bottom of the protocol stack, which may operate concurrently. The radio transceiver 208A operates in the 60 GHz band. The radio transceiver 208B operates in the 5 GHz band. The radio transceiver 208C operates in the 2.4 GHz band. The radio transceiver 208A in wireless device 100A is shown in a communications session over the 60 GHz band data path 230 with radio transceiver 208A in wireless device 100B. The radio transceiver 208C in wireless device 100A is shown in a communications session over the 2.4 GHz band data path 240 with radio transceiver 208C in wireless device 100B. The data paths 230 and 240 are shown operating concurrently, i.e. simultaneously. The example 802.11 MAC layer provides functionality to allow reliable data delivery for the upper layers over the wireless medium. The 802.11 MAC layer may use the IEEE 802.11 Wireless Gigabit Alliance (WGA) standard, as modified according to one example embodiment of the invention.

FIG. 1 illustrates also an alternate path from the Application 200 to the Payload Adaptation Layer (PAL) 210, and then to the 802.11 Media Access Layer 206. Not all traffic is based on IP, especially in the 60 GHz band, for example HDMI video (Audio Video data A/V). The functionality of the Payload Adaptation Layer (PAL) 210 is to provide packetization, de-packetization, rate control, and error recovery to the traffic. The Payload Adaptation Layer (PAL) 210 functionality can embodied in the hardware HW, for example included in the radio 208A or it may be separate hardware in the multiband wireless device.

The control module 220, internet protocol stack layers 202, 204, 206, and/or application program 200 may be embodied as program logic stored in the RAM 262 and/or ROM 264 in the form of sequences of programmed instructions which, when executed in the CPU 260, carry out the functions of the disclosed embodiments. The program logic can be delivered to the writeable RAM, PROMS, flash memory devices, etc. 262 of the multiband wireless devices (STAs) 100A and 100B from a computer program product or article of manufacture in the form of computer-usable media such as resident memory devices, smart cards or other removable memory devices. Alternately, they can be embodied as integrated circuit logic in the form of programmed logic arrays or custom designed application specific integrated circuits (ASIC).

Figure 2:
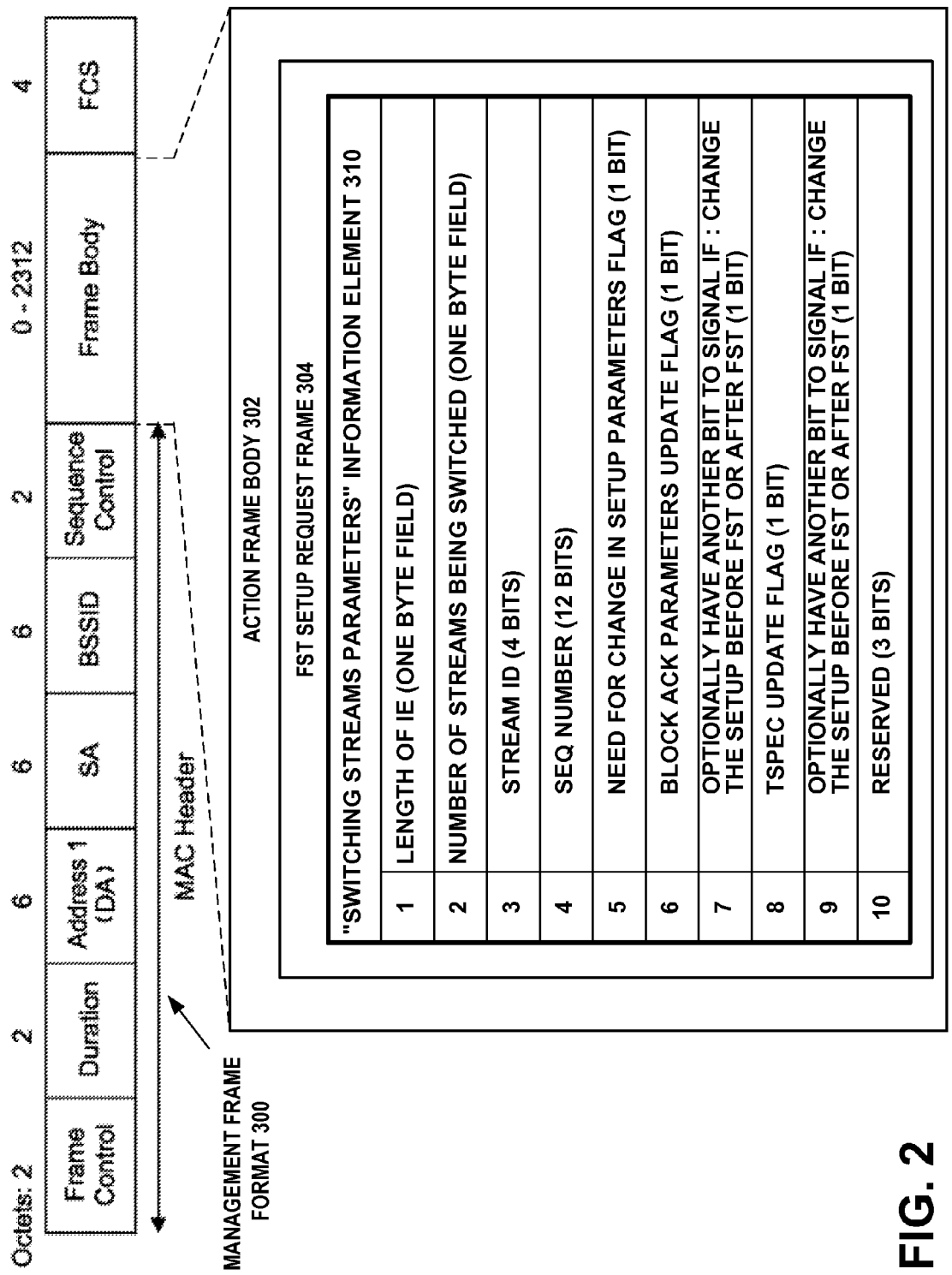
FIG. 2 illustrates an example of the "Switching Streams Parameters" information element 310 in an FST setup request frame 304.

FIG. 2 illustrates an example of the "Switching Streams Parameters" information element 310 in an Fast Session Transfer (FST) setup request frame 304. The FST setup request frame 304 is contained in the action frame body 302 of the management frame 300 shown in FIG. 2.

The management frame 300 is a MAC frame that includes a MAC header that comprises frame control, duration, address, and sequence control information. A variable length frame body contains information specific to the management frame type and subtype. The frame check sequence (FCS) an IEEE 32-bit cyclic redundancy code. The frame body contains the action frame body 302. Action frames are used to request a station to take action on behalf of another station. The format of an action frame is a category plus details that depend on the category. When a channel must be changed, stations that are a part of the network must be informed of the impending change by an action frame so that they may prepare to switch to the specified new channel. Many types of action frames have been specified in section 7.3.1.11 of the IEEE 802.11 Standard-2007, each with an action field that contains the category of an action and the details of that action. The WGA Draft Specification referred to above, specifies Fast Session Transfer (FST) action frames with their own category value. The Fast Session Transfer (FST) Setup Request frame and the Fast Session Transfer (FST) Setup Response frame are specified in the WGA Draft Specification.

According to one example embodiment, an enhancement to the Fast Session Transfer (FST) procedure is provided by introducing a new "Switching Streams Parameters" Information Element (IE) 310 to enable negotiating the parameters to be established as a result of switching of at least a portion of the existing data/traffic streams to a new frequency band. The "Switching Streams Parameters" information element 310 is contained in the FST setup request frame 304. The "Switching Streams Parameters" Information Element (IE) 310 includes at least the number of streams being switched and the stream ID for each stream being switched. The "Switching Streams Parameters" Information Element enables the transmitting device 100A and receiving device 100B to negotiate the connection setup parameters associated with a requested transfer of the operating frequency band.

The transmitting wireless device 100A sends a Fast Session Transfer (FST) Setup Request 304 with the "Switching Streams Parameters" Information Element (IE) 310 of FIG. 2, which includes at least the requested number of streams being switched and the stream ID for each requested stream being switched.

Figure 3:
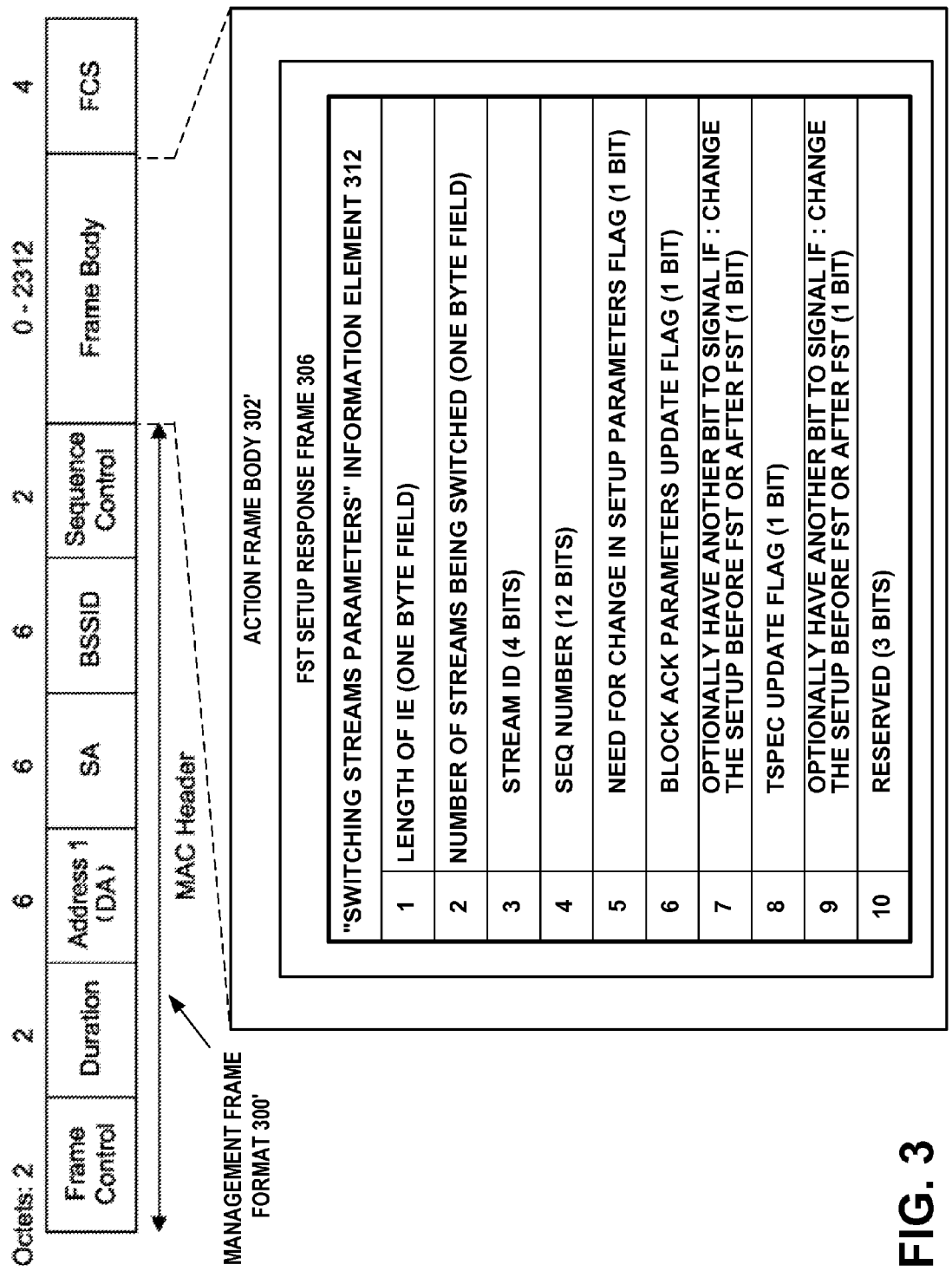
FIG. 3 illustrates an example of the "Switching Streams Parameters" information element 312 in an FST setup response frame 306.

The receiving wireless device (STA) 100B replies with a Fast Session Transfer (FST) Setup Response 306 with the "Switching Streams Parameters" Information Element (IE) 312 shown in FIG. 3, which either accepts the requested parameters or replies with an alternate number of streams being switched and the stream ID for each alternate stream being switched.

The receiving wireless device (STA) 100B may reply by including the "Switching Streams Parameters" Information Element (IE) 312 in Fast Session Transfer (FST) Setup Response 306, even if there was no "Switching Streams Parameters" Information Element (IE) 310 included in the Fast Session Transfer (FST) Setup Request. The "Switching Streams Parameters" Information Element (IE) 312 reply is contained in the FST Setup Response frame 306. The FST Setup Response frame 306 is contained in the action frame body 302' of the management frame 300' shown in FIG. 3. If the Switching Information Element (IE) 310 and 312 are not included in the respective Request and Response frames 304 and 306, then it is implicit that all the streams in the session are being switched according to one embodiment of the present invention. Even if all the streams are being switched, the Request and Response frames 304 and 306 may include the streams' parameters to enable a smooth QoS transition.

A multi-band capable STA may support session transfer through one of two operating modes according to one example embodiment of the present invention. In the first mode, session transfer between the two frequency bands is handled above the MAC. The MAC address may be different in the two bands and the MAC address used on the other band is indicated in the STA MAC Address field in Multiband element. In the second mode, session transfer between the two frequency bands is handled in the MAC and the transfer is transparent to the higher layers. The same MAC address is used in both bands and the STA MAC address field in the Multi-band element is not included by setting the STA MAC Address Present field to zero. If the STA MAC Address Present field is set to one, the STA MAC Address field is included in the Multi-band element. A multi-band capable STA may indicate the FST modes that it supports through the FST Mode field in all transmitted Multi-band information elements. A STA that supports transparent session transfer has the same station management entity (SME) for all frequency bands the STA supports."

In this manner, there is no need to re-establish the traffic streams, but instead the existing parameters are modified or scaled to meet the available resources in the new band, for example the QoS and the size of data packets that can be provided. This allows the state of the data exchanges, for example the Acknowledgement bitmap, to be carried forward from one band to another. Also, if for any reason, for example quality of service (QoS), there is any problem in switching a stream to be in a new band, it is possible to switch only specific streams by including only the stream IDs in the Information Element for the specific streams that are to be switched. Alternately, it is possible to abort the switching of all the streams.

The "Switching Streams Parameters" Information Element 310 may be included in the Fast Session Transfer Setup Request frame 304 and in the Fast Session Transfer Setup Response frame 306. Alternately, the Information Element may be included in a separate action frame.

The "Switching Streams Parameters" Information Element (IE) may include the following example information:

1) For example, it may include the identity of the streams being switched from one band to another, for example the traffic ID (TID) or traffic stream identifier (TSID) may be used to identify and distinguish the streams.

2) For example, it may include the sequence number of the streams. For example, use the last sequence number of a traffic stream that would be sent in the current band or the starting sequence number of the first data frame that would be transmitted in the new band. This is an estimate because there is a delay between the initiation of Fast Session Transfer (FST) and the actual completion of FST.

3) For example, the circumstance may be that the new band might not support all the capabilities as the old band or it is possible that there are additional capabilities in the new band. If there is a mismatch in the capabilities in the devices in the new band and old-band, the stream setup process is re-initiated after switching to the new band. Since each device knows what it can and it cannot support in the new band, it may signal in the FST Request frame and the FST Response frame if there is a need to repeat the set up in the new band. If there is need for redoing the set-up again the STAs, the "Switching Streams Parameters" Information Element (IE) may be included in the FST Request frame and the FST Response frame or it may also be sent as a separate action frame.

In one example embodiment, each of the setup parameters may be negotiated if they need to be updated before the Fast Session Transfer (FST) or after FST. In another example embodiment the parameters may be updated after Fast Session Transfer (FST) and before any data transfer begins.

According to one example embodiment of the invention, the "Switching Streams Parameters" Information Element (IE) shown in FIGS. 2 and 3 may include the following fields:

Length of IE (one byte field)
Number of streams being switched (one byte field)
For each stream being switched carry the following information (3 bytes each)
Stream ID (4 bits)
Following fields may also be included:
Sequence Number (12 bits)
Need for change in setup parameters flag (1 bit)
Block ACK parameters update flag (1 bit)
Optionally have another bit to signal whether to Change the setup before FST or after FST (1 bit)
Traffic specification (TSPEC) Update flag (1 bit)
Optionally have another bit to signal whether to Change the setup before FST or after FST (1 bit)
Reserved (3 bits)

Figure 4:
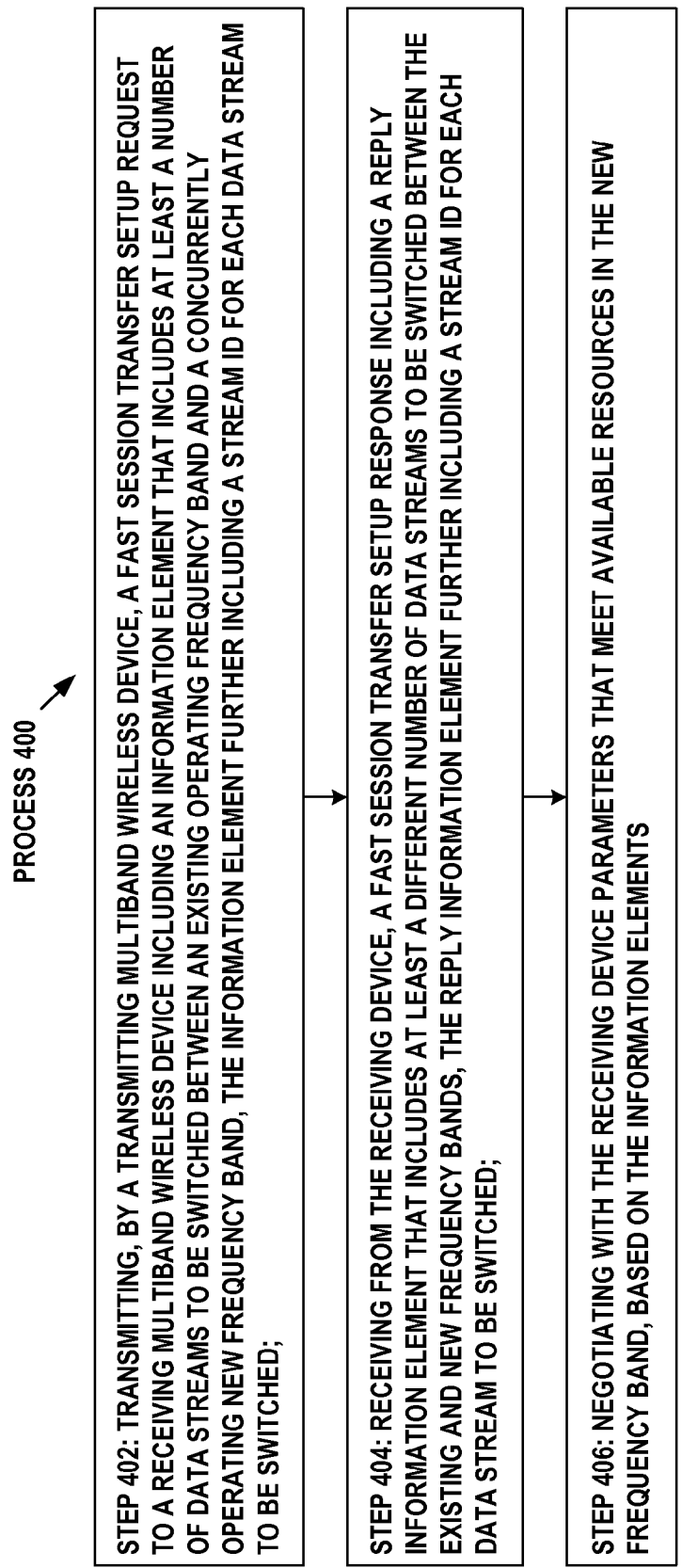
FIG. 4 is an example flow diagram of the process 400 for the operation of the transmitting multiband wireless device 100A.

FIG. 4 is an example flow diagram of the process 400 for the operation of the transmitting multiband wireless device 100A according to one embodiment of the present invention. An example method performed by the transmitting multiband wireless device 100A according to FIG. 4 includes the following steps:

Step 402: transmitting, by a transmitting multiband wireless device, a Fast Session Transfer Setup Request to a receiving multiband wireless device including an Information Element that includes at least a number of data streams to be switched between an existing operating frequency band and a concurrently operating new frequency band, the Information Element further including a stream ID for each data stream to be switched;

Step 404: receiving from the receiving device, a Fast Session Transfer Setup Response including a reply Information Element that includes at least a different number of data streams to be switched between the existing and new frequency bands, the reply Information Element further including a stream ID for each data stream to be switched; and Step 406: negotiating with the receiving device parameters that meet available resources in the new frequency band, based on said information elements.

Figure 5:
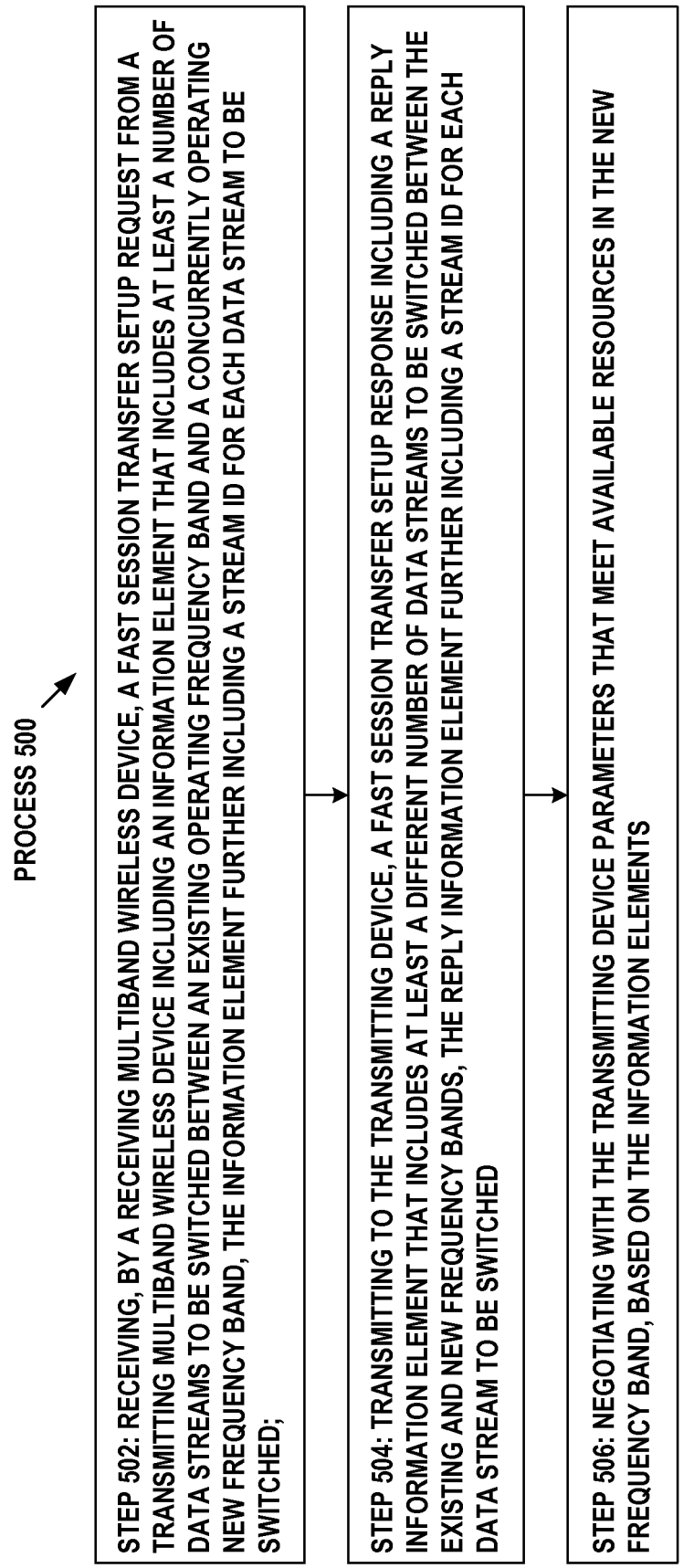
FIG. 5 is an example flow diagram of the process 500 for the operation of the receiving multiband wireless device 100B.

FIG. 5 is an example flow diagram of the process 500 for the operation of the receiving multiband wireless device 100B according to one embodiment of the present invention.

Step 502: receiving, by a receiving multiband wireless device, a Fast Session Transfer Setup Request from a transmitting multiband wireless device including an Information Element that includes at least a number of data streams to be switched between an existing operating frequency band and a concurrently operating new frequency band, the Information Element further including a stream ID for each data stream to be switched;

Step 504: transmitting to the transmitting device, a Fast Session Transfer Setup Response including a reply Information Element that includes at least a different number of data streams to be switched between the existing and new frequency bands, the reply Information Element further including a stream ID for each data stream to be switched; and Step 506: negotiating with the transmitting device parameters that meet available resources in the new frequency band, based on said information elements.

Figure 6:
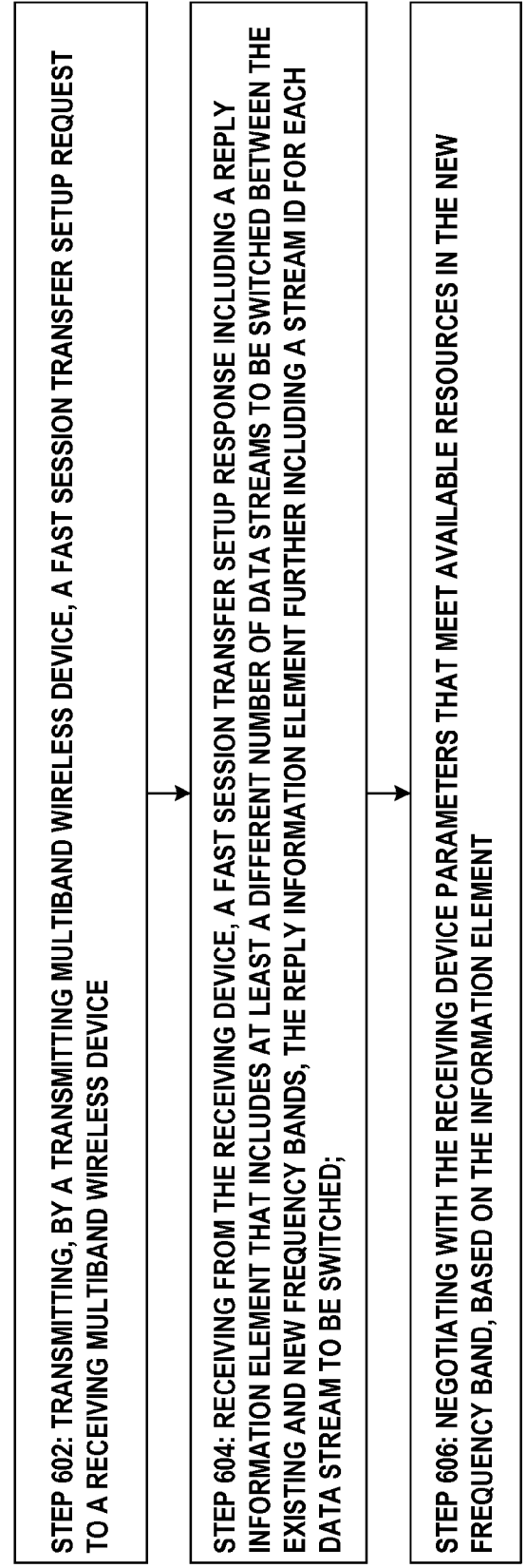
FIG. 6 is an example flow diagram of another process 600 for the operation of the transmitting multiband wireless device 100A.

FIG. 6 is an example flow diagram of another process 600 for the operation of the transmitting multiband wireless device 100A according to one embodiment of the present invention. An example method performed by the transmitting multiband wireless device 100A according to FIG. 6 includes the following steps:

Step 602: transmitting, by a transmitting multiband wireless device, a Fast Session Transfer Setup Request to a receiving multiband wireless device;

Step 604: receiving from the receiving device, a Fast Session Transfer Setup Response including a reply Information Element that includes at least a different number of data streams to be switched between the existing and new frequency bands, the reply Information Element further including a stream ID for each data stream to be switched; and Step 606: negotiating with the receiving device parameters that meet available resources in the new frequency band, based on said information element.

FIG. 7 is an example flow diagram of another process 700 for the operation of the receiving multiband wireless device 100B according to one embodiment of the present invention.

Step 702: receiving, by a receiving multiband wireless device, a Fast Session Transfer Setup Request from a transmitting multiband wireless device;

Step 704: transmitting to the transmitting device, a Fast Session Transfer Setup Response including a reply Information Element that includes at least a different number of data streams to be switched between the existing and new frequency bands, the reply Information Element further including a stream ID for each data stream to be switched; and Step 706: negotiating with the transmitting device parameters that meet available resources in the new frequency band, based on said information element.

The method performed by the multiband wireless devices 100A and 100B may be implemented by a computer program stored in their memories 262 or 264 as a sequence of programmable instructions which, when executed by their processors 260, carry out the functions of the embodiments of the invention. The example program may be stored in a computer readable medium, such as their memory 264, storing computer executable program code.

In this manner, there is no need to re-establish the traffic streams, but instead the existing parameters are modified or scaled to meet the available resources in the new band, for example the QoS and the size of data packets that can be provided. This allows the state of the data exchanges, for example the Acknowledgement bitmap, to be carried forward from one band to another. Also, if for any reason, for example quality of service (QoS), there is any problem in switching a stream to be in a new band, it is possible to switch only specific streams by including only the stream IDs in the Information Element for the specific streams that are to be switched. Alternately, it is possible to abort the switching of all the streams.

An example application to be used according to one or more embodiments of the invention is a video telephone session conducted between multiband wireless devices 100A and 100B on the 60 GHz band data path 230 in FIG. 1, while simultaneously collaborating in editing a document between devices 100A and 100B on the 2.4 GHz band data path 240. The video telephone session on the 60 GHz band data path 230 is a high definition, color presentation of each respective user to the other user, requiring a large bandwidth that is available on the 60 GHz band. The collaborative editing application requires only a relatively small bandwidth that is available on the 2.4 GHz band. The display of the remote user's image for the video telephone session is a miniature picture-within-a-picture superimposed on the display of the document being edited. The user of one of the multiband wireless devices, for example device 100B, moves the device so as to interpose an obstacle, such as a wall, in the 60 GHz band data path 230, causing an increase in the bit error rate of the video telephone signal received by device 100A. In response, multiband wireless device 100A transmits a "Switching Streams Parameters" Information Element (IE) 310 in an FST setup request frame 304 to initiate negotiating the parameters to be established as a result of switching of at least a portion of the video telephone data stream from the 60 GHz band data path 230 to the 2.4 GHz band data path 240. The "Switching Streams Parameters" Information Element (IE) 310 specifies the stream ID of the video telephone stream being switched. The FST setup request frame 304 can be transmitted on either the 60 GHz band data path 230 or the 2.4 GHz band data path 240.

Continuing the example, the application program 200 in device 100B responds to the request from device 100A by preparing the video telephone data stream for the proposed transfer, such as by reducing its bandwidth requirements to a level that could be accommodated by the 2.4 GHz band data path 240. The required reduction in bandwidth could be, for example, by changing the video stream from a 16-bit per pixel color representation to a four-bit per pixel gray-scale representation, reducing the resolution, and reducing the picture frame rate from 30 per second to 2 per second. The receiving multiband wireless device (STA) 100B replies with a Fast Session Transfer (FST) Setup Response 306 with the "Switching Streams Parameters" Information Element (IE) 312 shown in FIG. 3, which replies with the stream ID of the video telephone stream being switched and a suggested sequence number for the frame in which to make the transition. The FST setup response frame 306 can be transmitted on either the 60 GHz band data path 230 or the 2.4 GHz band data path 240. The multiband wireless devices 100A and 100B can continue exchanging Fast Session Transfer (FST) Setup request and response frames 304 and 306 to complete their negotiation of the transfer of the reduced bandwidth video telephone data stream to the 2.4 GHz band data path 240.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention. For instance, the features described herein may be employed in networks other than Wireless LAN networks.

What is claimed is:

1. A method, comprising:

transmitting, by a transmitting multiband wireless device, a session transfer request to a receiving multiband wireless device, the session transfer request comprising an information element that includes at least a number of data streams suggested to be switched between an existing operating frequency band and a concurrently operating new frequency band, the information element further including at least a stream ID for each data stream to be switched and an indication of the length of the information element;

receiving from the receiving device, a session transfer response comprising a reply information element that includes at least a number of data streams to be switched between the existing and new frequency bands, the reply information element further including a stream ID for each data stream to be switched and an indication of the length of the information element; and negotiating with the receiving device, by transmitting at least one additional session transfer request and receiving at least one additional session transfer response, to exchange parameters that meet available resources in the new frequency band.

2. The method of claim 1, wherein the information elements include sequence number of the streams.

3. The method of claim 1, wherein the information elements include a signal when there is a need to repeat setting up the new band.

4. The method of claim 1, wherein setup parameters are negotiated if they need to be updated before the session transfer, after the session transfer, or after the session transfer and before any data transfer begins.

5. The method of claim 1, wherein the information elements include a flag signaling a need for change in setup parameters.

6. The method of claim 1, wherein the information elements include a flag signaling a Block ACK parameters update.

7. The method of claim 1, wherein the information elements include a flag signaling a traffic specification update.

8. The method of claim 1, wherein the session transfer request is a fast session transfer setup request frame and the session transfer response is a fast session transfer setup response frame.

9. The method of claim 1, further comprising:

switching the number of data streams to be switched between the existing and new frequency bands, after negotiating with the receiving device parameters that meet available resources in the new frequency band.

10. A device, comprising:

a multiband wireless transceiver; and a processor and memory configured with programmed instructions, which when executed by the processor, control the operation of the transceiver to:

transmit a session transfer request to a receiving multiband wireless device comprising an information element that includes at least a number of data streams suggested to be switched between an existing operating frequency band and a concurrently operating new frequency band, the information element further including at least a stream ID for each data stream to be switched and an indication of the length of the information element;

receive from the receiving device, a session transfer response comprising a reply information element that includes at least a number of data streams to be switched between the existing and new frequency bands, the reply information element further including a stream ID for each data stream to be switched and an indication of the length of the information element; and negotiate with the receiving device, by transmitting at least one additional session transfer request and receiving at least one additional session transfer response, to exchange parameters that meet available resources in the new frequency band.

11. A non-transitory computer program product, comprising:

a computer readable medium configured to store program instructions, which when executed by a computer processor, control the operation of a transceiver to:

transmit, by a transmitting multiband wireless device, a session transfer request to a receiving multiband wireless device comprising an information element that includes at least a number of data streams suggested to be switched between an existing operating frequency band and a concurrently operating new frequency band, the information element further including at least a stream ID for each data stream to be switched and an indication of the length of the information element;

receive from the receiving device, a session transfer response comprising a reply information element that includes at least a number of data streams to be switched between the existing and new frequency bands, the reply information element further including a stream ID for each data stream to be switched and an indication of the length of the information element; and negotiate with the receiving device, by transmitting at least one additional session transfer request and receiving at least one additional session transfer response, to exchange parameters that meet available resources in the new frequency band.

12. A method, comprising:

receiving, by a receiving multiband wireless device, a session transfer request from a transmitting multiband wireless device comprising an information element that includes at least a number of data streams suggested to be switched between an existing operating frequency band and a concurrently operating new frequency band, the information element further including at least a stream ID for each data stream to be switched and an indication of the length of the information element;

transmitting to the transmitting device, a session transfer response comprising a reply information element that includes at least a number of data streams to be switched between the existing and new frequency bands, the reply information element further including a stream ID for each data stream to be switched and an indication of the length of the information element; and negotiating with the transmitting device, by receiving at least one additional session transfer request and transmitting at least one additional session transfer response, to exchange parameters that meet available resources in the new frequency band.

13. A device, comprising:

a multiband wireless transceiver; and a processor and memory configured with programmed instructions, which when executed by the processor, control the operation of the transceiver to:

receive a session transfer request from a transmitting multiband wireless device comprising an information element that includes at least a number of data streams suggested to be switched between an existing operating frequency band and a concurrently operating new frequency band, the information element further including at least a stream ID for each data stream to be switched and an indication of the length of the information element;

transmit to the transmitting device, a session transfer response comprising a reply information element that includes at least a number of data streams to be switched between the existing and new frequency bands, the reply information element further including a stream ID for each data stream to be switched and an indication of the length of the information element; and negotiate with the transmitting device, by receiving at least one additional session transfer request and transmitting at least one additional session transfer response, to exchange parameters that meet available resources in the new frequency band.

14. A non-transitory computer program product, comprising:

a computer readable medium configured to store program instructions, which when executed by a computer processor, control the operation of a transceiver to:

receive, by a receiving multiband wireless device, a session transfer request from a transmitting multiband wireless device comprising an information element that includes at least a number of data streams suggested to be switched between an existing operating frequency band and a concurrently operating new frequency band, the information element further including at least a stream ID for each data stream to be switched and an indication of the length of the information element;

transmit to the transmitting device, a session transfer response comprising a reply information element that includes at least a number of data streams to be switched between the existing and new frequency bands, the reply information element further including a stream ID for each data stream to be switched and an indication of the length of the information element; and negotiate with the transmitting device, by receiving at least one additional session transfer request and transmitting at least one additional session transfer response, to exchange parameters that meet available resources in the new frequency band.

\* \* \* \* \*